UNITED STATES PATENT OFFICE.

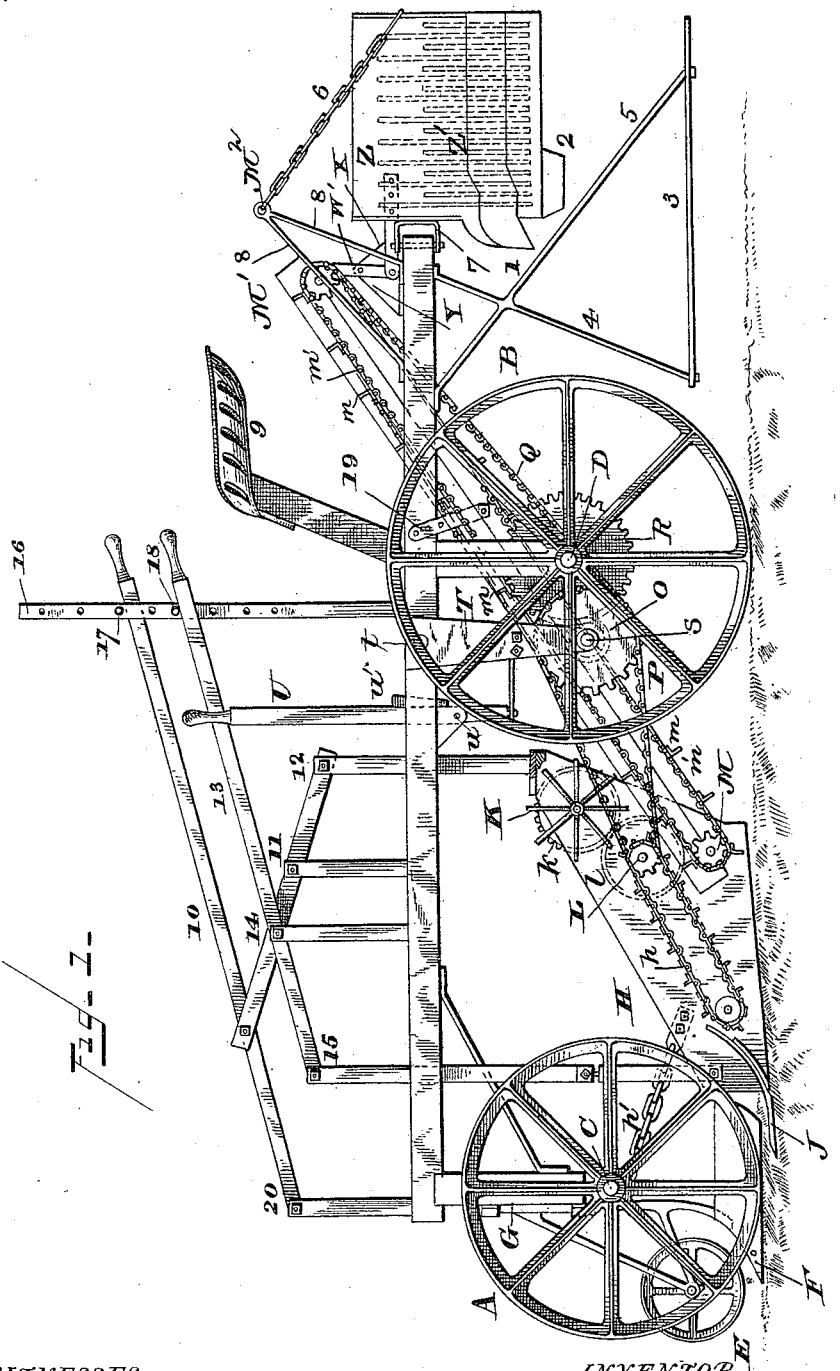

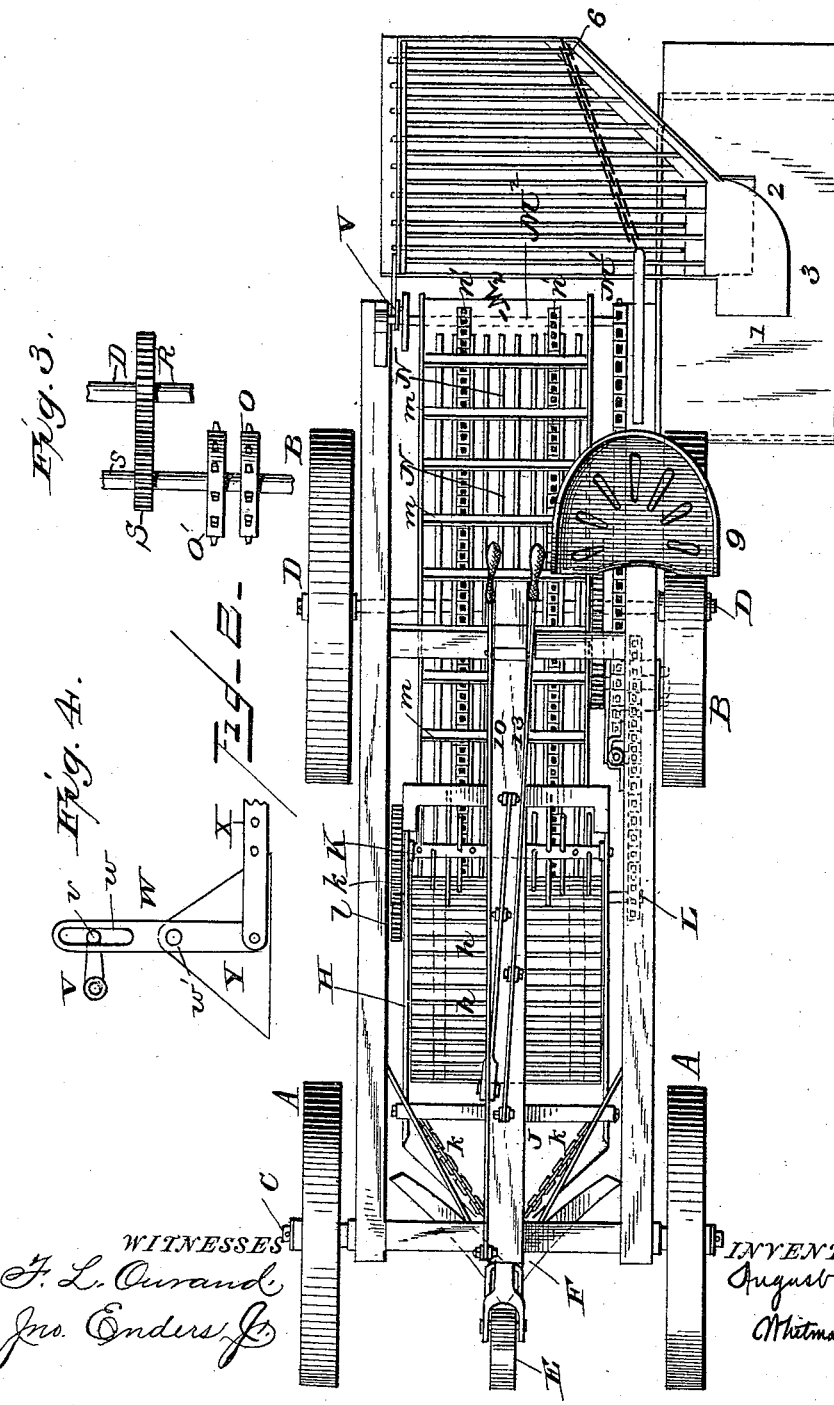

AUGUST LARSON, OF WAUSAU, WISCONSIN.

POTATO-DIGGER.

SPECIFICATION forming part of Letters Patent No. 451,329, dated April 28, 1891.

Application filed August 2, 1890. Serial No. 360,761. (No model.)

*To all whom it may concern:*

Be it known that I, AUGUST LARSON, a citizen of the United States, residing at Wausau, in the county of Marathon and State of Wisconsin, have invented certain new and useful Improvements in Potato-Diggers; and I do hereby declare the following to be a full, clear, and exact description of the invention, such as will enable others skilled in the art to which it appertains to make and use the same.

My invention relates to agricultural implements, and has for its object the providing of a suitable implement for digging potatoes, beets, turnips, onions, peanuts, and other roots, whereby the labor of cutting away the vines or leaves of the plants, unearthing the roots, and gathering them in a suitable receptacle is all done by the machine instead of by hand.

Reference is made to the accompanying drawings, wherein similar parts are indicated by similar letters and figures.

Figure 1 represents a side elevation of my machine, the side of the apron and elevator being removed to better illustrate the mechanisms therein. Fig. 2 represents a plan view of my machine. Fig. 3 represents a detail view of the auxiliary shaft, showing the gearing. Fig. 4 represents a detail view of the vibrating mechanism for the screen.

A and B are the wheels of the potato-digger, having axles C and D, respectively.

E represents a small wheel attached to the standard G and at a fixed distance from the scraper F, secured on the same standard G.

The object of the wheel E is to skim along the ground, while the scraper F, entering just below the surface, removes the vines, grass, &c. The height of the scraper and wheel E is regulated by a set-screw (not shown) in the standard G, both scraper F and wheel E being attached to a rod sliding in a slot in the frame G and held at any position desired by the set-screw.

J is a shovel-plow or scoop throwing the earth, potatoes, &c., into the apron H. Here the earth containing the potatoes falls upon the carrier $h$, whose slats are angle-irons about an inch apart. A small part of the earth drops between these slats; but the larger portion goes under the beater K, where the clods are broken up by the teeth of the beater and then falls on the elevator. This is composed of longitudinal ribs or planks N, spaced about an inch apart and secured in the framework of the elevator. Over these ribs slide the angle-irons $m$ $m$, pushing the earth and potatoes along before them. Most of the earth and the very small potatoes drop between the wooden ribs. The remainder are carried up the elevator and drop into the screen. This is made in two compartments, the upper compartment Z, having a coarse mesh, holds the larger potatoes. The smaller ones drop through into the lower compartment Z', while all the remaining earth is shaken off by the vibrations of the screen. The two screens slope toward their respective chutes 1 and 2 and the potatoes fall into baskets placed on the platform 3.

To enter more into detail, the main driving-gear of the machine R is keyed fast on the rear axle D, and engages in the pinion S, Fig. 3, on a short counter-shaft $s$. This counter-shaft is hung on two hangers T, pivoted at $t$. By means of the lever U, pivoted at $u$, and the wedge $u'$, the pinion S may be thrown into or out of engagement and the mechanism of the potato-digger be put into or out of operation, as may be desired. On the counter-shaft $s$ are two sprocket-wheels O and O', engaging in the links of the chains P and Q, respectively. The chain P turns the sprocket-wheel L, which runs the carrier $h$. On the opposite end of the same shaft with L is a cog-wheel $l$, gearing into the cog-wheel $k$ on the beater-shaft. The sprocket-wheel O thus moves the carrier $h$ and turns the beater K. The sprocket-wheel O' and chain Q turn the shaft $M^2$. On this shaft are two sprocket-wheels engaging in the chains $m'$ of the elevator. At the end V, Fig. 4, of the elevator-shaft a crank with pin $v$ vibrates the lever W, pivoted at $w'$, and so shakes the screens, which are attached to X. The lever W is slotted, as at $w$, so as to allow the crank-pin to move vertically in the slot, while at the same time giving the full lateral throw. The screens are supported by the chain 6, attached to the davits 8, and by the hinge 7, both hinges and chain allowing the screens to be shaken freely.

V is a support for the pivot $w'$ of the lever W.

4 and 5 are rods supporting the platform 3, on which the baskets are put.

9 is the driver's seat.

Inasmuch as it is desirable to vary the depth plowed by J, the levers 10 and 13 are provided to lift up the rear and the front, respectively, of the apron H.

13 is a simple lever, pivoted at 14, and by it the front end of the apron H and the plow J may be raised or lowered at will.

10 is a compound lever with fixed pivots at 20 and 11. By it the rear end of the apron H may be raised or lowered at will.

16 is a bar with holes and pins for securing the handles of the levers; but a racked bar with spring-catches on the levers could be used for the same purpose; and also a quadrant with a rack and spring-catch might be used in place of the wedge $w'$ for securing the lever U.

In order that the elevator may be adapted for the raising or lowering of the rear end of the apron, the elevator is pivoted at its upper end and is hung near the center of its sides on the two hangers 19, having several holes for the securing-pin.

The frame-work of the carriage may be of any suitable material, preferably iron, and the rear wheels may, if necessary, have studs or teeth to hold the ground more firmly.

It will be readily seen that should it be desired to allow the potatoes to drop on the ground in lieu of the basket, there to dry in the sun, the screens and platform may be omitted and a chute leading from the upper end of the elevator substituted therefor. After drying on the ground, the potatoes could be gathered up by hand; but I prefer to take them directly from the earth, clean them, gather them into baskets, and afterward spread them out to dry in some convenient place.

I do not wish to limit myself to the devices described and shown, as many modifications would readily suggest themselves to a skilled mechanic which would be used without departing from the spirit of my invention.

I claim—

1. In a potato-digger, the combination of the distance-wheel and scraper, both attached to a common rod and held by a set-screw in a standard, with the scoop, apron H, beater K, elevator N, the separating-screens Z and Z', and platform 3, as herein shown.

2. In a potato-digger, the combination of the distance-wheel and scraper, both attached to a common rod and held by a set-screw in a standard, with the scoop and carrying-apron capable of being raised or lowered at either end by the simple lever 13 and the compound lever 10, substantially as described.

3. In a potato-digger, the combination of the wheel E and scraper F, both attached to a common rod and held by a set-screw in the standard G, with the scoop J and apron H, capable of being raised or lowered at either end by the simple lever 13 and the compound lever 10, the beater K, elevator N, screens Z and Z', and platform 3, as set forth.

4. In a potato-digger, the combination of the main gear-wheel R, keyed on the rear axle D, with the pinion S and sprocket-wheels O and O', keyed on the shaft $s$, the chains P and Q, engaging in the sprocket-wheels and in the driving sprocket-wheels L of the carrier and M' of the elevator, respectively, the lever U and wedge $u$, hangers T, and the cog-wheels $l$ and $k$, keyed to the shafts L and K, as herein shown and described.

5. In a potato-digger, the combination of the main gear-wheel R, keyed on the rear axle D, with the pinion S and sprocket-wheels O and O', keyed on the shaft $s$, the chains P and Q, engaging in these sprocket-wheels and in the driving sprocket-wheels L of the carrier and M' of the elevator, respectively, the lever U, wedge $u$, hangers T, the cog-wheels $l$ and $k$, keyed to the shafts L and K, together with the carrier having slats formed of angle-irons engaging in the two carrier-chains, and the elevator composed of parallel ribs over which slide the angle-irons $m\,m'$, secured to the elevator-chain, substantially as described.

6. In a potato-digger, the screens hinged to the rear end of the carriage and supported by the chain 6, having the strap X connected to the vibrating lever W, having slot $w$ for crank-pin $v$, and crank V on the shaft $M^2$, substantially as described.

7. In a potato-digger, the screens hinged to the rear end of the carriage and supported by the chain 6, the upper screen having a larger mesh than the lower and both sloping toward their respective chutes 1 and 2, the screens having the strap X connected to the vibrating lever W, having slot $w$ for crank-pin $v$, and crank V on the shaft $M^2$, and the platform 3, as herein shown and described.

In testimony whereof I affix my signature in presence of two witnesses.

AUGUST LARSON.

Witnesses:
H. B. HUNTINGTON,
R. H. JOHNSON.